(12) United States Patent
Sterling et al.

(10) Patent No.: US 7,747,715 B2
(45) Date of Patent: Jun. 29, 2010

(54) OBJECT DISTRIBUTION

(75) Inventors: Keith Sterling, London (GB); Richard Hughes, London (GB); Allan Jenkins, London (GB); William Box, London (GB); Ian Middleton, London (GB)

(73) Assignee: Jacobs Rimell Limited, London (GB)

( * ) Notice: Subject to any disclaimer, the term of this patent is extended or adjusted under 35 U.S.C. 154(b) by 1087 days.

(21) Appl. No.: 10/492,407

(22) PCT Filed: Oct. 15, 2002

(86) PCT No.: PCT/GB02/04673

§ 371 (c)(1),
(2), (4) Date: Apr. 12, 2004

(87) PCT Pub. No.: WO03/034218

PCT Pub. Date: Apr. 24, 2003

(65) Prior Publication Data

US 2005/0108724 A1 May 19, 2005

(30) Foreign Application Priority Data

Oct. 15, 2001 (GB) ................... 0124703.0

(51) Int. Cl.
*G06F 15/173* (2006.01)
*G06F 17/10* (2006.01)

(52) U.S. Cl. .................. 709/223; 709/218; 709/226; 707/1; 707/103 Y; 707/103 Z; 707/103 R; 707/8; 717/108; 717/116

(58) Field of Classification Search ............. 707/1–206; 709/218, 223; 717/108, 116
See application file for complete search history.

(56) References Cited

U.S. PATENT DOCUMENTS

| 5,159,662 | A | * | 10/1992 | Grady et al. .................. 706/48 |
| 5,202,985 | A | * | 4/1993 | Goyal ............................. 707/4 |
| 5,276,776 | A | * | 1/1994 | Grady et al. .................. 706/48 |
| 5,287,507 | A | * | 2/1994 | Hamilton et al. ............ 719/315 |
| 5,297,283 | A | * | 3/1994 | Kelly et al. .................. 718/104 |
| 5,325,524 | A | * | 6/1994 | Black et al. ................... 707/10 |
| 5,463,774 | A | * | 10/1995 | Jenness ....................... 707/10 |
| 5,787,284 | A | | 7/1998 | Blainey et al. |
| 6,041,318 | A | * | 3/2000 | Danford-Klein et al. .... 705/400 |
| 6,088,717 | A | * | 7/2000 | Reed et al. .................. 709/201 |
| 6,230,312 | B1 | | 5/2001 | Hunt |
| 6,324,543 | B1 | * | 11/2001 | Cohen et al. ................ 707/200 |

(Continued)

FOREIGN PATENT DOCUMENTS

EP 0438020 3/1995

OTHER PUBLICATIONS

British Patent Office, Search Report of priority application No. GB 0124703.0, Jul. 19, 2002.

*Primary Examiner*—John Follansbee
*Assistant Examiner*—Saket K Daftuar
(74) *Attorney, Agent, or Firm*—Zilka-Kotab, PC

(57) ABSTRACT

A method of locating objects in a distributed electronic environment comprising defining a plurality of object-types, which object-types are assigned a plurality of attributes, one attribute being an object-precedence attribute. A plurality of home locations for objects are defined. When a new object is instantiated, which object has associations with other objects, the new object is located at the home location of the existing object which has the highest precedence value of all the associated objects.

10 Claims, 1 Drawing Sheet

U.S. PATENT DOCUMENTS

| | | | |
|---|---|---|---|
| 6,345,288 B1 * | 2/2002 | Reed et al. | 709/201 |
| 6,456,995 B1 * | 9/2002 | Salo et al. | 707/1 |
| 6,460,058 B2 * | 10/2002 | Koppolu et al. | 715/738 |
| 6,681,367 B1 * | 1/2004 | Griwodz et al. | 715/234 |
| 7,096,465 B1 * | 8/2006 | Dardinski et al. | 717/178 |
| 7,158,676 B1 * | 1/2007 | Rainsford | 382/190 |
| 7,206,805 B1 * | 4/2007 | McLaughlin, Jr. | 709/203 |
| 7,260,543 B1 * | 8/2007 | Saulpaugh et al. | 705/1 |
| 7,290,056 B1 * | 10/2007 | McLaughlin, Jr. | 709/230 |
| 2001/0020243 A1 * | 9/2001 | Koppolu et al. | 707/513 |
| 2002/0175911 A1 * | 11/2002 | Light et al. | 345/419 |

* cited by examiner

OBJECT DISTRIBUTION

CROSS-REFERENCE TO RELATED APPLICATIONS

The present application is a national stage filing of PCT International Application No. PCT/GB02/04673 filed on Oct. 15, 2002, and further claims priority to GB Application No. 0124703.0 filed on Oct. 15, 2001.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTION

1. Field of the Invention

The invention relates to a method of locating objects in a distributed electronic system.

2. Description of Related Art Including Information Disclosed Under 37 CFR 1.97 and 1.98

In certain distributed systems, in which system components may also be geographically distributed, the problem of deciding where to locate, or home, objects within the system arises. These objects may have geographic dependencies themselves, as may further objects which relate to the first set.

Generally the problem of identifying where an object should be homed and what the optimum configuration with respect to network and processor efficiency is a challenging one. This problem is further compounded when this object relates (with processing dependencies) to a number of further objects within the system, which further objects are diversely located across the system themselves.

U.S. Pat. No. 5,787,284 discloses a method in which programs are grouped together based on the weights of connections, i.e. the execution count between procedures, between the objects and their costs. System-imposed constraints on memory size can be taken into account to avoid creating groupings that overload system capacity. Such a method is generally applicable only in a processor environment and does not deal adequately with the restrictions imposed by operation in a distributed environment.

BRIEF SUMMARY OF THE INVENTION

The present invention seeks to provide a method of distributing objects in an efficient manner with respect to one another.

According to the invention there is provided a method of locating objects in a distributed electronic environment comprising defining a plurality of object-types, which object-types are assigned a plurality of attributes, one attribute being an object-precedence attribute, defining a plurality of home locations for objects, wherein when a new object is instantiated, which object has associations with other objects, the new object is located at the home location of the existing object which has the highest precedence value of all the associated objects.

Preferably, the value of the object-precedence is unique for each object-type. Preferably, the precedence value is determined such that objects having a relationship with other objects are located in proximity to one another.

In the method of the invention objects which are related to each other are advantageously arranged in proximity to each other such that overheads associated with processes which reference these objects are minimized. This approach improves the efficiency of processing throughout a system of disparate processors in comparison to the conventional techniques of not organizing these relationships, such as a random placing of object through the distributed system or the organized homing of all objects of a given type at a single home.

DETAIL DESCRIPTION OF EXEMPLARY EMBODIMENTS OF THE INVENTION

Figure 1:
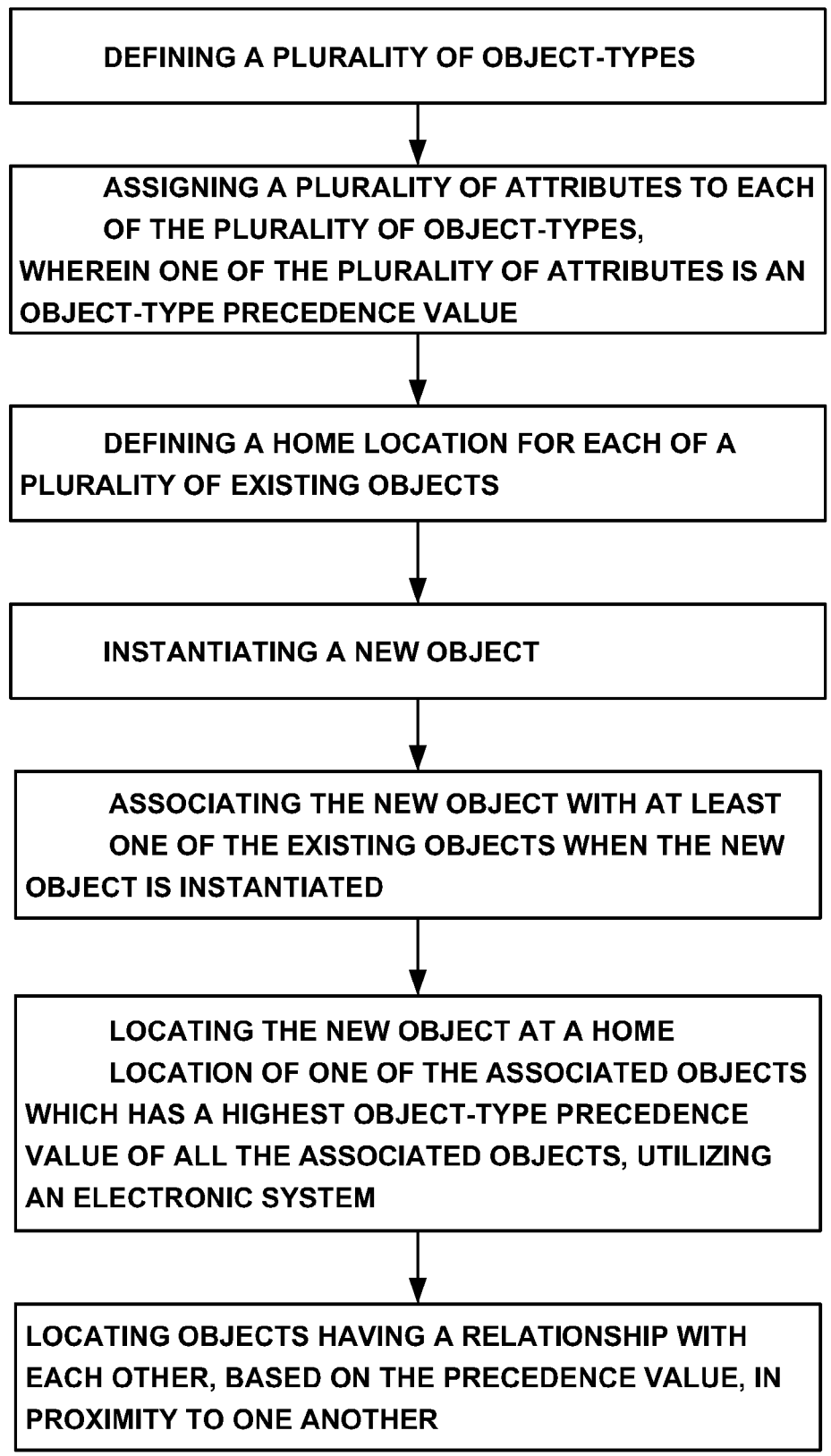
FIG. 1 illustrates a method for locating objects in a distributed electronic environment, in accordance with one embodiment.

An exemplary embodiment of the invention will now be described in greater detail with reference to the examples.

In a conventional object oriented environment, each object within the system is of a particular class. Following a standard object oriented approach, each object within the system is an instance of such a class. This means that a base description, or template of an object is provided as a class definition, and from this template, an object has been created or instantiated. This object then takes on the properties of this template or object-type.

As part of the object-type definition, an attribute known as object-type precedence is defined. The object-type precedence is defined as having a integer value, which should be unique. Therefore, each and every object within the electronic system is assigned a predetermined object-type precedence value based upon what object-type they are instantiated from. The value of the object-type precedence attribute is that assigned to the object-type precedence attribute within that class. The method of assigning values to the object-type precedence attribute may be manually determined by entering specific values, or may be automated by means of a unique number generator.

The respective values of the pre-determined object-type precedent values are determined by the location of an initial number of objects within the system. These objects may not have any relationship to one another. Once these initial objects have been 'homed', they provide the basis for assigning 'homes' to newly defined objects which relate to them within the system. The intention of this is to reduce inter-process communication and associated overheads, thus increasing efficiency compared to a simple pooling of objects of the same type together at the same processing location.

In an electronic system, it is known to use a policy based management system. A policy is an administrator-specified directive that manages certain aspects of the desired outcome of interactions within a given system. This system may provide an environment for users, applications, services, and infrastructure or any other quantifiable object. A policy provides guidelines for how these different entities within such an environment should be managed in response to interactions within the system.

In the following example, it is assumed for sake of clarity that only one object per object-type may be associated with another object.

It makes sense to 'home' Policy 1 with at least one of the objects which already exist in the system which Policy 1 has associations with (processing dependencies). This is not association through existing 'homes', but is association through precedence value, i.e. it is the precedence value which determines which existing object the new object should be homed with. The home is determined by looking at where that existing object currently resides. An object 'Policy1' might be associated with the following objects:

Policy1: ObjectA, ObjectB, ObjectC

Each of these objects is of the following object-types:

ObjectA: Object-typeXX
ObjectB: Object-typeYY
ObjectC: Object-typeZZ

Where each object-type has the following object-type precedence values assigned to them:

Object-typeXX: 1
Object-typeYY: 3
Object-typeZZ: 2

Also, the objects have already been assigned 'homes' at the following locations:

ObjectA: located at HomeN
ObjectB: located at HomeO
ObjectC: located at HomeP

As a result of this, Policy 1 is homed at Home N, if another object is instantiated and is associated with Policy 1, then it will also be homed at HomeN even if the new object has a higher precedence value itself. This is determined by the precedence value of the existing object with which the new object is associated with rather than the precedence value of the new object. The object Policy1 is will be 'homed' or located at HomeN since, of the objects which are associated with Policy1, Object-type has the highest precedence. Therefore since ObjectA is of Object-type and is located at HomeN, therefore Policy1 will be also located at HomeN.

The example assumes that '1' is the highest precedence value—it need not be, it alternatively could be that the higher the value, the higher the precedence.

It is not a problem to associate more than one object of the same type with another specific object. This simply results in both of the new objects of the same type being homed at the same server.

The invention claimed is:

1. A method of locating objects in a distributed electronic environment comprising:
   defining a plurality of object-types;
   assigning a plurality of attributes to each of the plurality of object-types, wherein one of the plurality of attributes is an object-type precedence value;
   defining a home location for each of a plurality of existing objects;
   instantiating a new object;
   associating the new object with at least one of the existing objects when the new object is instantiated;
   locating the new object at a home location of one of the associated objects which has a highest object-type precedence value of all the associated objects, utilizing an electronic system; and
   locating objects having a relationship with each other, based on the precedence value, in proximity to one another;
   wherein the value of the object-type precedence is unique for each of the plurality of object types;
   wherein the new object is assigned the object-type precedence value based upon what object-type the new object is instantiated from;
   wherein the object-type precedence value is that assigned to an object-type precedence attribute within a class;
   wherein a management policy is homed with at least one of the plurality of existing objects, the management policy having an association with the at least one of the plurality of existing objects;
   wherein the management policy is homed at a first location;
   wherein, if another object is instantiated and is associated with the management policy, then the other object is homed at the first location;
   wherein the homing of the other object is determined by the precedence value of the management policy with which the other object is associated rather than the precedence value of the other object.

2. The method of claim 1, wherein the objects having the relationship with each other are arranged in proximity to each other such that overheads associated with processes which reference the objects having the relationship with each other are minimized.

3. The method of claim 1, wherein the object-type precedence is defined as having a integer value.

4. The method of claim 1, wherein the object-type precedence value is manually determined.

5. The method of claim 1, wherein the object-type precedence value is automatically assigned by a unique number generator.

6. The method of claim 1, wherein the object-type precedent value is determined by the home location of the plurality of existing objects.

7. The method of claim 1, wherein the association is an association through the object-type precedence value.

8. The method of claim 7, wherein the object-type precedence value determines which of the plurality of the existing objects the management policy is homed with.

9. The method of claim 7, wherein the homing of the management policy is determined by looking at where the at least one of the plurality of existing objects resides.

10. The method of claim 1, wherein the other object is homed at the first location even if the other object has a higher precedence value than a precedence value of the management policy.

* * * * *